United States Patent
Coerman et al.

(10) Patent No.: US 11,970,037 B2
(45) Date of Patent: Apr. 30, 2024

(54) METHOD FOR CONTROLLING A VERTICAL VIBRATION DAMPING OF AT LEAST ONE WHEEL OF A VEHICLE AND VEHICLE VERTICAL VIBRATION DAMPING OF AT LEAST ONE WHEEL

(71) Applicant: Ford Global Technologies, LLC, Dearborn, MI (US)

(72) Inventors: Cyril Coerman, Leverkusen (DE); Uwe Hoffmann, Leverkusen (DE); Georg Johann Maurer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 550 days.

(21) Appl. No.: 17/196,440

(22) Filed: Mar. 9, 2021

(65) Prior Publication Data
US 2021/0283972 A1 Sep. 16, 2021

(30) Foreign Application Priority Data
Mar. 11, 2020 (DE) .................. 1012020106642.2

(51) Int. Cl.
*B60G 17/0165* (2006.01)
*B60G 17/018* (2006.01)
(Continued)

(52) U.S. Cl.
CPC ....... *B60G 17/0165* (2013.01); *B60G 17/018* (2013.01); *B60G 17/01933* (2013.01);
(Continued)

(58) Field of Classification Search
None
See application file for complete search history.

(56) References Cited

U.S. PATENT DOCUMENTS 5,467,280 A * 11/1995 Kimura .................. B60G 17/08
280/5.515
5,671,142 A * 9/1997 Tatarazako ............. B60G 17/06
701/37
(Continued)

FOREIGN PATENT DOCUMENTS

CN 114953883 A * 8/2022
CN 218702584 U * 3/2023
(Continued)

*Primary Examiner* — Kevin R Steckbauer
(74) *Attorney, Agent, or Firm* — Burr & Forman LLP (57) ABSTRACT

A method for controlling a vertical vibration damping of a wheel of a vehicle, in which the wheel has a suspension including a vibration damper with a control element including an actuating element for adapting a damping characteristic of the vibration damper includes a series of steps. The vehicle includes a first sensor for detecting roadway anomalies, a second sensor for detecting a vertical displacement of the wheel, and a control unit connected to the first and second sensors and the control element. The method steps include detecting roadway anomalies with the first sensor, detecting the vertical displacement with the second sensor and switching the vibration damper with the control element at a first point in time from a first state with a first damping characteristic into a second state with a second damping characteristic when a first sensor signal generated by the first sensor indicates a roadway anomaly with a minimum height.

12 Claims, 4 Drawing Sheets

(51) Int. Cl.
  *B60G 17/019* (2006.01)
  *B60G 17/08* (2006.01)
(52) U.S. Cl.
  CPC .......... *B60G 17/08* (2013.01); *B60G 2204/62* (2013.01); *B60G 2400/204* (2013.01); *B60G 2400/252* (2013.01); *B60G 2400/821* (2013.01); *B60G 2500/104* (2013.01); *B60G 2600/182* (2013.01)

(56) References Cited

U.S. PATENT DOCUMENTS

| | | | | |
|---|---|---|---|---|
| 6,092,011 | A * | 7/2000 | Hiramoto | B60G 17/08 701/48 |
| 8,788,146 | B1 | 7/2014 | Lu et al. | |
| 9,586,455 | B2 | 3/2017 | Sugai et al. | |
| 10,132,719 | B2 | 11/2018 | Fudulea | |
| 10,378,159 | B2 | 8/2019 | Svantesson et al. | |
| 11,007,837 | B2 * | 5/2021 | Mohamed | B60G 17/018 |
| 11,814,036 | B2 * | 11/2023 | Furuta | B60G 17/06 |
| 2018/0154723 | A1 | 6/2018 | Anderson et al. | |
| 2019/0232748 | A1 * | 8/2019 | Mohamed | B60G 17/0165 |
| 2021/0283972 | A1 * | 9/2021 | Coerman | B60G 17/0165 |
| 2021/0354523 | A1 * | 11/2021 | Hirao | B60G 17/06 |
| 2022/0134833 | A1 * | 5/2022 | Furuta | B60G 17/06 701/37 |
| 2022/0135021 | A1 * | 5/2022 | Furuta | B60W 40/06 701/41 |
| 2022/0379679 | A1 * | 12/2022 | Eisenmann | B60G 17/0165 |
| 2023/0019390 | A1 * | 1/2023 | Wei | B60G 17/0165 |

FOREIGN PATENT DOCUMENTS

| | | | | |
|---|---|---|---|---|
| CN | 115891549 | A * | 4/2023 | |
| CN | 116108323 | A * | 5/2023 | |
| CN | 114435056 | B * | 8/2023 | ......... B60G 17/0165 |
| CN | 115659694 | B * | 8/2023 | |
| CN | 116620584 | A * | 8/2023 | |
| DE | 102010044263 | A1 * | 3/2012 | ......... B60G 17/0165 |
| DE | 102012022367 | A1 * | 5/2014 | ......... B60G 17/0165 |
| DE | 102016216008 | A1 * | 3/2018 | ......... B60G 17/0165 |
| DE | 102019211003 | A1 * | 1/2021 | |
| DE | 102020106642 | A1 * | 9/2021 | ......... B60G 17/0165 |
| DE | 102020106642 | B4 * | 12/2022 | ......... B60G 17/0165 |
| DE | 112019005068 | B4 * | 1/2023 | ........... B60G 17/015 |
| EP | 4116118 | A1 * | 1/2023 | ......... B60G 17/0165 |
| JP | 6773881 | B2 * | 10/2020 | ......... B60G 17/0165 |
| JP | 7108357 | B2 * | 7/2022 | ........... B60G 17/015 |
| WO | WO-2018036709 | A1 * | 3/2018 | ......... B60G 17/0165 |
| WO | WO-2018155541 | A1 * | 8/2018 | ......... B60G 17/0165 |
| WO | WO-2020075455 | A1 * | 4/2020 | ........... B60G 17/015 |
| WO | WO-2021091909 | A1 * | 5/2021 | ......... B60G 17/0165 |

* cited by examiner

METHOD FOR CONTROLLING A VERTICAL VIBRATION DAMPING OF AT LEAST ONE WHEEL OF A VEHICLE AND VEHICLE VERTICAL VIBRATION DAMPING OF AT LEAST ONE WHEEL

TECHNICAL FIELD

Example embodiments generally relate to motor vehicle suspension, and more particularly relate to controlling a vertical vibration damping of at least one wheel of a vehicle and a suitable vehicle with vertical vibration damping of at least one wheel.

BACKGROUND

When traversing roadway unevenness, oscillations of the wheels are generated, due to which the vertical force of the relevant vehicle with respect to the roadway varies. As a result, the controllability of the vehicle can be diminished. In order to allow the oscillations to die out as quickly as possible, vibration dampers are provided in the wheel suspension.

Vehicles frequently include active, semi- and/or adaptive suspension systems of the wheels, in order to control, in particular, vertical movements of the wheels. The suspension features, such as, for example, damping and stiffness, are selectively adapted to abnormal roadway conditions. An example of adaptive suspension system may be referred to as Continuously Controlled Damping (CCD). In order to provide the highest possible level of comfort for the vehicle occupants, the dampings of the vibration dampers are set at a relatively low level. Dampings set at a low level result in higher vertical loads, however, when the vehicle traverses a roadway anomaly and impacts the edge of the roadway anomaly, which delimits the roadway anomaly with respect to the roadway situated therebehind in the direction of travel. In this context, a roadway anomaly is to be understood as a deviation from the evenness of a roadway surface, for example, a bump or the like.

In order to be able to adapt the damping characteristics of the vibration dampers in the wheel suspension during travel, in particular upon the occurrence of roadway anomalies, to the current roadway profile, it may be possible to optically detect the particular region of the roadway situated ahead in the direction of travel with a camera sensor. Image data associated with the optical detection of the roadway ahead may then be evaluated and, on the basis of information obtained regarding roadway anomalies in the region of the roadway ahead, which is to be traversed soon, control signals may be determined for the vibration dampers. Thereafter, a dynamic adaptation of the damping characteristics of the vibration dampers may be conducted, as necessary. In DE 10 2015 205 369 B4, for example, a method for operating a suspension system is presented, in which a height profile of the roadway ahead is determined on the basis of the optically gathered information, and a control signal for controlling the suspension system is dynamically adapted based on the optically gathered information.

U.S. Pat. No. 8,788,146 discloses an adaptive suspension system in which roadway anomalies ahead are detected with a laser scanner and then classified. The suspension system is then adjusted depending on the particular classification. For the purpose of classification, vehicle state vectors are determined under consideration of vehicle dynamics parameters of the vehicle, among other things, the current height.

U.S. Pat. No. 10,378,159 discloses a system for detecting roadway anomalies, in which vehicles determine roadway anomalies on the basis of data of on-board vibration and height sensors and make the data available to other vehicles via a wireless network.

U.S. Pat. No. 9,586,455 discloses a device for estimating the condition of a roadway surface situated ahead of a vehicle in the direction of travel. A front camera of the vehicle gathers image information of the preceding vehicle, and the movements of its wheels are evaluated.

U.S. Patent Application Publication No. 2018/0154723 discloses an autonomously driving vehicle with integrated active suspension is presented, in the case of which a topographic map of the roadway is created with the aid of various sensors, in order to assess, on the basis thereof, the condition of the roadway ahead and adapt the suspension system or change the route.

U.S. Pat. No. 10,132,719 discloses a method for monitoring the reliability of sensors at the wheel by utilizing data of a hydropneumatic suspension system.

BRIEF SUMMARY OF SOME EXAMPLES

In accordance with an example embodiment, a method for controlling a vertical vibration damping of a wheel of a vehicle, in which the wheel has a suspension including a vibration damper with a control element including an actuating element for adapting a damping characteristic of the vibration damper may be provided. The vehicle includes a first sensor for detecting roadway anomalies, a second sensor for detecting a vertical displacement of the wheel, and a control unit connected to the first and second sensors and the control element. The method includes detecting roadway anomalies with the first sensor while the vehicle is moving, detecting the vertical displacement with the second sensor and switching the vibration damper with the control element at a first point in time from a first state with a first damping characteristic into a second state with a second damping characteristic when a first sensor signal generated by the first sensor indicates a roadway anomaly with a minimum height. A reset of the vibration damper with the control element from the second state into the first state may be accomplished when a second sensor signal generated by the second sensor does not indicate a change of the vertical displacement by at least the minimum height within a detection period starting with the first point in time.

In another example embodiment, a vehicle suspension system may be provided that includes a control unit for performing the method described above.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

The detection and analysis of the roadway ahead in the direction of travel is often done in order to adapt, depending thereon, the vibration damping of the vehicle wheels. This adaptive vibration damping is aimed at improving ride comfort for the occupants of the vehicle. However, the improvement on the ride comfort for the vehicle occupants can actually be affected by the quality of the evaluation of the detected optical signals. The quality of the evaluation of the detected optical signals may in turn depend, for example, on environmental factors, such as the brightness, the weather, the roadway profile, etc. However, due to the perspective, which is limited (camera sensors are located on board the vehicle), in principle, three-dimensional roadway anomalies can only ever be faultlessly detected to a limited extent anyway. The detection of roadway anomalies in optical signals can therefore be faulty and, in particular, result in false-positive detections of roadway anomalies, since, in the case of doubt, the tendency is to assume the presence of a roadway anomaly. Accordingly, adjusting the damping characteristics of dampers based on incorrect assumptions about the presence of roadway anomalies may not result in improvement, but rather may possibly result in a deterioration of the ride comfort. However, if detection criteria are merely tightened, i.e., threshold values are raised, in order to avoid erroneous detections, this reduces the functional capability of the damping system due to false non-detections of existing roadway anomalies.

Example embodiments may address this problem of improving ride comfort for vehicle occupants of a vehicle, in situations in which the wheels have vibration damping that is controllable depending on roadway anomalies detected ahead. In this regard, for example, a method for controlling a vertical vibration damping of at least one wheel of a vehicle may be provided that address the potential for false detections that may cause unnecessary damper adjustments.

In this regard, for example, some embodiments may relate to a method for controlling a vertical vibration damping of at least one wheel of a vehicle. In this context, the wheel has a suspension, which includes an arrangement of a vibration damper with a final control element including at least one actuating element for adapting a damping characteristic of the vibration damper. The vehicle may also include at least one first sensor for detecting roadway anomalies in a region of a roadway surface situated ahead in the movement direction of the vehicle, at least one second sensor for detecting a vertical displacement of the wheel, and a control unit connected to the first sensor, the second sensor, and the final control element. The method may include detecting roadway anomalies with the first sensor during movement of the vehicle, detecting the vertical displacement of the wheel with the second sensor, and switching the vibration damper with the final control element at a first point in time from a first state with a first damping characteristic into a second state with a second damping characteristic when a first sensor signal generated by the first sensor indicates a roadway anomaly with a minimum height. Example embodiments may provide for a reset of the vibration damper with the final control element from the second state into the first state when a second sensor signal generated by the second sensor does not indicate a change of the vertical displacement by at least the minimum height within a detection period starting with the first point in time and/or when a speed, with which the change of the vertical displacement takes place, exceeds a minimum speed.

The switch of the vibration damper from one state into another state takes place by suitably adjusting, i.e., adapting, the actuating element or the actuating elements of the final control element. The actuating elements are adapted and, if necessary, continuously adjusted in each of the states according to the associated desirable damping characteristic. In this regard, the actuating elements may be operated in such a way that a continuous adjustment is ensured across the state transitions. The vibration damper is therefore still variable within the limits set by the selected damping technology.

In contrast to the first state, in the second state, the damping characteristic may be adapted in such a way that—if there is not an erroneous detection—the vibration damper is prepared for the impending contact of the wheel with the roadway anomaly ahead detected in the first sensor signal. In the case of electrically controlled actuating elements, this can mean, for example, reducing the control current. In this way, gentle contact is to be made possible. In addition, for the vibration damper, for the impending strong contact effect, the response time upon activation when contact is made with the roadway anomaly with the minimum height can then be reduced by proactively adjusting the actuating element or the actuating elements even before their activation. In the second state, the damping characteristic may be selected in such a way that it represents a compromise between the damping characteristic in the first state and a maximum possible softness, since the adjustment takes place under the precondition that it is not certain whether a real roadway anomaly was detected or whether an erroneous detection occurred. The force requirement is reduced, for example, to a fraction of the force requirement in the first state, for example, to less than 25%, or for example to 20%.

Actuating elements may include, for example, valves such as feed valves and pressure valves. Vibration dampers may include, for example, semi-active vibration dampers or active vibration dampers. For example, semi-active magnetorheological vibration dampers may include, for example, electromagnets as actuating elements or their actuators. The final control element or its actuating elements of an active vibration damper may include a pump or another actuator for actively adjusting valves.

The vertical displacement of a wheel corresponds to the change of the vertical extension of the vibration damper and, thereby, the distance of the vertically movable section of the vibration damper or the wheel hub connected thereto to the chassis or a part of the vibration damper rigidly connected thereto.

The control unit may be connected to the first sensor and receive the first sensor signal therefrom. The control unit may also be connected to the second sensor and receive the second sensor signal therefrom. The control unit may also evaluate the first and second sensor signals and apply a suitable force requirement to the final control element, i.e., generate control signals and commands for the final control element, i.e., for the one or the multiple actuating element(s) contained therein, or their actuators, in order to suitably adjust the force requirement with respect to the vibration damper.

The movement of the vehicle relates, in particular, to an essentially longitudinal movement, driven by an engine of the vehicle, into the monitored region ahead of the vehicle. In some examples, the first sensor, which can include one or even multiple separate sensor unit(s), utilizes an optical method or another radiation-based method, in order to detect the region ahead of the vehicle. The first sensor can be, for example, a camera sensor or a radar or LIDAR sensor.

The second sensor detects the vertical displacement of the wheel. The second sensor can be, for example, a height or distance sensor. However, in some examples, the second sensor may be a pressure sensor, which can infer the displacement of the wheel on the basis of pressure changes at the vibration damper. Alternatively or additionally, for example, a wheel acceleration sensor can also be utilized, which also characterizes the movement of the wheel. The wheel travel or changed vertical displacement results by appropriate integration of the acceleration signal in such examples.

The minimum height of the roadway anomaly may be determined, on the one hand, by which height differences can still be detected in the signals of the first sensor with the particular sensor that is utilized. On the other hand, the minimum height can be set to be even greater when an adaptation of the vibration damping is not to take place for every roadway anomaly that can be detected. The minimum speed for the change of the vertical displacement of the wheel, i.e., the minimum speed, with which the vibration damper is compressed as the roadway anomaly is traversed, is established, for example, depending on an expected steepness of the rising edge of the roadway anomaly and the vehicle speed.

The described method may increase the robustness of the vibration damping with respect to erroneous detections of roadway anomalies, without the need to make changes to the reception of first sensor signals with the first sensor or the utilized methods of analysis. A check may be carried out to determine whether the previously detected roadway anomaly actually acts upon the wheel within the vehicle dynamics and structure-related detection period. If a relevant effect is not detected, the change of the damping characteristic is not continued, and so the ride comfort is not unnecessarily deteriorated by an unsuitable adaptation of the damping characteristic.

The described method makes it possible to maintain the advantages of a forward-looking control of the vibration dampers for each wheel of the vehicle. In some cases, a considerable deterioration of the ride comfort in the event of erroneous detections is simultaneously also continuously prevented. The method may be suited, for example, in particular for CCD vibration dampers, with one valve as well as with two valves as actuating elements.

In addition to the change of the vertical displacement of the wheel, it can be provided to additionally evaluate the detection of the roadway anomaly at the wheel, for example, on the basis of a check of one further criterion. As an example, a gradient or the speed of the change of the displacement of the wheel may be used. In this way, adapting the damping characteristic of the vibration damper can be avoided, even though the roadway anomaly generates only few oscillations to be damped, due to merely gently rising or falling edges.

In the first state, a control may be undertaken in a mode in which the ride comfort for the vehicle occupants is optimized during travel on a roadway without roadway anomalies. In an example embodiment, it is provided that, at least in the first state, the control unit controls a skyhook control of the vibration damper, i.e., the final control element controls according to the "skyhook" principle. Such damping controls are utilized, for example, for CCD and are designed, in particular, for the comfort of the vehicle occupants. In the skyhook control, the required damping force is dependent on the absolute vertical speed of the vehicle body (i.e., the unsprung mass). They are better suited than passive dampers for damping a vertical vehicle movement. The comfort may be at the expense of a vertical wheel oscillation in this case.

In an example embodiment, the method may include detecting a current speed of the vehicle and establishing a detection period, i.e., a time period in which the confirmation of a roadway anomaly detected by the first sensor by a signal of the second sensor is expected, in order not to handle the detection as an erroneous detection, depending on the current speed of the vehicle and a distance of the vehicle anomaly to the vehicle. In this way, the detection period can be adapted during the trip in such a way that it reliably includes the point in time, at which the wheel should traverse the previously detected roadway anomaly, without being extended for an unnecessarily long period of time thereafter. Depending on how accurately the distance to the roadway anomaly is to be or can be determined, the detection period can be precisely adapted thereto. In one exemplary embodiment, it can also be provided, however, not to determine the distance to the particular detected roadway anomaly during travel, but rather to constantly establish the distance value according to the farthest distance of the region of the roadway ahead, in which roadway anomalies are sought, regardless of where the roadway anomaly is detected in this region.

In an example embodiment, a switch of the vibration damper with the final control element from the second state into a third state with a third damping characteristic may be provided when the second sensor signal generated by the second sensor indicates a change of the vertical displacement by at least the minimum height within the detection period starting with the first point in time and/or the speed of the change of the vertical displacement exceeds the minimum speed. If the actual contact with the previously detected roadway anomaly that has already been detected by the first sensor is confirmed by the second sensor at a second point in time, the vibration damper is switched, by the final control element, controlled by the control unit, into a third state, in which the damping characteristic is designed for effectively damping oscillations additionally occurring due to the roadway anomaly being traversed and, for example, avoiding a maximum compression of the vibration damper. The third state may be retained at least for as long as it takes until the second sensor signal no longer indicates the change of the vertical displacement by at least the minimum height or until the vibration damper is once again located in its initial state before the change of the vertical displacement by the roadway anomaly. In this context, the minimum speed of the change may no longer be exceeded. In some cases, the third state may be a time period that is maintained, in which, for example, the force requirement on the final control element can be reduced according to a ramp function.

In an example embodiment, the switch of the vibration damper into the third state may include applying a force requirement to the final control element that depends on the extent of the vertical displacement of the wheel (and, thereby, a degree of the compression of the vibration damper or the length contraction of the vibration damper), a speed, with which the vertical displacement of the wheel (and, thereby, the compression of the vibration damper) takes place, and a remaining distance to a maximum displacement of the wheel (and, thereby, a maximum length contraction of the vibration damper). The maximum displacement of the wheel may be determined by the fact that the vibration damper is compressed to such an extent that a physical end limitation prevents further compression. In this way, the damping characteristic in the third state may be further adapted to the actual roadway anomaly and its effect on the wheel. Thus, for example, even extreme impacts nevertheless do not compress the vibration damper to a maximum extent, although, in the case of less extreme impacts, the vibration damper is not adjusted to be unnecessarily hard. The speed, with which the vertical displacement of the wheel takes place, can be determined by evaluating the signals of the second sensor over time. In one example embodiment, it may be provided that the force requirement increases exponentially when the remaining distance to the maximum displacement of the wheel falls below a limiting value. In this way, damage of the vibration damper is avoided and the occurrence of noise that is unpleasant for the occupants can be prevented.

In one exemplary embodiment, the switch of the vibration damper into the third state may include applying a constant force requirement to the final control element that is increased as compared to a force requirement in the first state, or operating the final control element with a skyhook control that is intensified as compared to a skyhook control in the first state with an increased force requirement, or, in the third state, applying a force requirement to the final control element according to a decay function. In the case of a skyhook control, i.e., a vibration damping control according to the skyhook principle, now with an increased force requirement, it can be provided, for example, to increase the force requirement by approximately 400% to 600% (e.g., by 500%). In the case of a decay function, the start value may be established, for example, depending on the height and the speed of the occurrence of the roadway anomaly or depending on the extent of the vertical displacement of the wheel, the speed, with which the vertical displacement of the wheel takes place, and the remaining distance to a maximum displacement of the wheel and is maintained until the roadway anomaly no longer exceeds the minimum height (determinable on the basis of the second sensor signal) and is then reduced according to a selected function, for example, a ramp function. In all three aforementioned possibilities, it is ensured that the vibration damper is adjusted to be harder when the wheel, for example, rolls down from the highest point of the roadway anomaly than when the damping characteristic was left in the first state. In this way, the movement of the vehicle body after the wheel impacts the roadway anomaly can be better controlled.

In one example embodiment, switching the vibration damper into the third state may include determining a plurality of possible force requirements and, from these, selecting a maximum force requirement to be applied to the final control element. The possible force requirements can be, for example, the aforementioned force requirements, i.e., an increased constant force requirement, an enlargement of the values determined in the skyhook control, and a force requirement according to a suitable decay function. Due to the selection of the greatest value, it can be ensured that the vibration damping suffices in any case.

In an example embodiment of the method, switching the vibration damper into the second state may include applying a force requirement to the final control element that depends on a classification of the roadway anomaly with respect to the vertical dimension, the gradient of the edges of the roadway anomaly, and the speed of the vehicle, or operating the final control element with a skyhook control reduced as compared to a skyhook control in the first state with a reduced force requirement. Switching the vibration damper into the second state may relate to the phase, in which the roadway anomaly ahead was detected with the first sensor, but before it is traversed by the wheel and is detected with the second sensor. In this state, the vibration damper may be prepared for the impending contact (provided this is not an erroneous detection). In some cases, classifying the roadway anomaly may be further undertaken after discovery of the roadway anomaly. Classifying the discovered roadway anomaly may make it possible to adapt the vibration damping to the condition of the roadway surface. The characteristics of the roadway anomalies and the speed of the vehicle may be taken into account, because different extents of roadway unevenness have different effects on the motor vehicle at different speeds. One further possibility may be to continue a currently applied skyhook control, but with a reduced force requirement. For example, a considerable reduction by approximately 80% to 95% (e.g., 90%) may be provided.

In an example embodiment, switching the vibration damper into the second state may include determining a plurality of possible force requirements and, from these, selecting a minimum force requirement to be applied to the final control element. The possible force requirements can be, for example, the aforementioned force requirements.

A second aspect of some example embodiments may relate to a vehicle with vertical vibration damping of at least one wheel of the vehicle. The wheel includes a suspension, which includes an arrangement of a vibration damper with a final control element including at least one actuating element for adapting a damping characteristic of the vibration damper. In addition, the vehicle may include at least one first sensor for detecting roadway anomalies in a region of a roadway surface ahead in the movement direction of the vehicle, at least one second sensor for detecting a vertical displacement of the wheel, and a control unit connected to the first sensor, the second sensor, and the final control element. The control unit may be configured for controlling a method according to the first aspect described above. Therefore, the advantages and particularities of the method according to some example embodiments for controlling a vertical vibration damping of at least one wheel of a vehicle, including each of its embodiments, are also implemented within the scope of a suitable vehicle with vertical vibration damping of at least one wheel.

Figure 1:
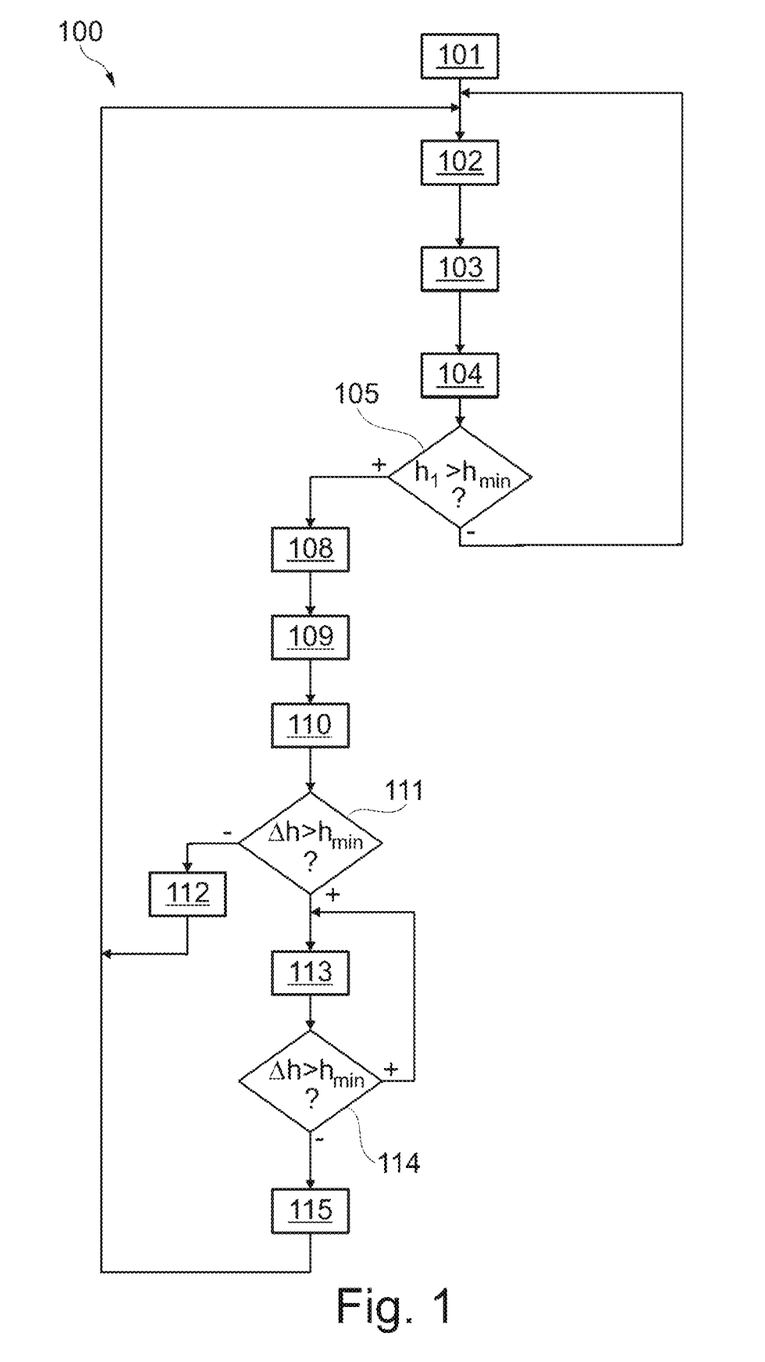
FIG. 1 is a schematic representation of an example of a method for controlling a vertical vibration damping of at least one wheel of a vehicle according to an example embodiment.

FIG. 1 shows a schematic representation of an example of a method 100 for controlling a vertical vibration damping of at least one wheel of a vehicle according to an example embodiment. In this context, the wheel has a suspension, which includes an arrangement of a vibration damper with a final control element including at least one actuating element for adapting a damping characteristic of the vibration damper. The vehicle includes at least one first sensor for detecting roadway anomalies in a region of a roadway surface situated ahead in the movement direction of the vehicle, at least one second sensor for detecting a vertical displacement of the wheel, and a control unit connected to the first sensor, the second sensor, and the final control element.

The method 100 may begin with a start of movement of the vehicle at operation 101. The movement may be continued during the implementation of the method. In the example embodiment shown, a step of operating the vibration damper in a first state with a first damping characteristic may be initially provided at operation 102. Operation 102 may include, for example, the vibration damper being controlled with a skyhook control. Skyhook theory is that the ideal suspension would let the vehicle maintain a stable posture as if suspended by an imaginary hook in the sky, unaffected by road conditions. Thus, the only dynamic elements would include a spring and a damper separating the vehicle body from the wheel.

At operation 103, a detection of roadway anomalies with the first sensor, for example, with a camera sensor, radar, LIDAR, or another sensor, may be performed. In other words, detection at operation 103 may include a detection of roadway anomalies in a region of the roadway surface situated ahead in the movement direction of the vehicle and to be rolled over soon with the wheel. In addition, a detection of the vertical displacement of the wheel $\Delta h$ with the second sensor may be performed at operation 104. In some cases, the detection with the first sensor and the second sensor may take place simultaneously (or nearly so) and may be continued during the entire operating time of the vibration damper, for example, for as long as the vehicle is moving.

In a further operation 105, a check may take place to determine whether a sensor signal generated by the first sensor indicates a roadway anomaly with a minimum height $h_{min}$. The minimum height $h_{min}$ can be, for example, in a range of less than 5 centimeters and can be, for example, 3 cm. The height of the roadway anomaly is the height deviation of the surface of the roadway anomaly from the roadway surface situated ahead and behind. If the first sensor signal does not indicate a height $h_1$ that exceeds the minimum height $h_{min}$ (marked in FIG. 1 by "−"), the vibration damper may remain set in the first state of operation 102. If the minimum height $h_{min}$ is exceeded (marked FIG. 1 by "+"), a switch of the vibration damper with the final control element may take place at a first point in time from the first state into a second state with the second damping characteristic at operation 108. Operation 108 may include, for example, applying to the final control element a force requirement dependent on a classification of the roadway anomaly with respect to the vertical dimension, the gradient of the edges of the roadway anomaly, and the speed of the vehicle, or operating the final control element with a skyhook control reduced as compared to a skyhook control in the first state with a reduced force requirement.

In the example embodiment shown, a next step may include a detection of the current speed of the vehicle at operation 109 and establishing a detection period depending on the current speed of the vehicle and a distance of the roadway anomaly to the vehicle at operation 110. The detection period refers to the time period, within which the (perceived) detection of a roadway anomaly in the signal of the first sensor must be confirmed by a detection by the second sensor, in order not to be handled as an erroneous detection. In this regard, a detection of a roadway anomaly that is not an erroneous detection may be expected to cause a movement of the wheel when the roadway anomaly is encountered by the wheel. Thus, the second sensor (by detecting such movement) can confirm the accuracy of the first sensor's detection. The determination of the distance of the roadway anomaly in the first sensor signal can be carried out either actually for the detected roadway anomaly or can be established as a constant value, which indicates the farthest distance of the region of the roadway ahead, in which roadway anomalies are sought. The detection of the speed can also take place continuously since the start of the movement of the vehicle.

In a further operation 111, a check may take place to determine whether a second sensor signal generated by the second sensor indicates a change of the vertical displacement $\Delta h$ of the wheel by at least the minimum height $h_{min}$ within the detection period. If this is not the case (marked in FIG. 1 by "−"), an erroneous detection has occurred and operation 112 may be performed. Operation 112 may include a reset of the vibration damper may take place with the final control element from the second state into the first state and the method is continued again with the step of operating the vibration damper in the first state of operation 102. In other embodiments, it can be provided, instead thereof or additionally, to check whether the speed of the change of the vertical displacement exceeds a minimum speed.

If, in the embodiment shown, the check made at operation 111 yields that the second sensor signal indicates a change of the vertical displacement by at least the minimum height $h_{min}$ (marked in FIG. 1 by "+") within the detection period, then an erroneous detection has not occurred and operation 113 may be accomplished. Operation 113 may include a switch of the vibration damper with the final control element from the second state into a third state with a third damping characteristic, which is designed for effectively damping oscillations additionally occurring due to the roadway anomaly being traversed. Operation 113 may include, for example, applying a constant force requirement to the final control element that is increased as compared to a force requirement in the first state, or operating the final control element with a skyhook control that is intensified as compared to a skyhook control in the first state with an increased force requirement. This state may be maintained at least until operation 114, which includes carrying out a check to determine whether the displacement further exceeds the minimum height. Meeting the minimum height is shown by the arrow marked in FIG. 1 by "+" when proceeding from operation 114. If this is not the case (marked in FIG. 1 by "−" when proceeding from operation 114), then operation 115 may be conducted. Operation 115 may include conducting a reset of the vibration damper with the final control element from the third state into the first state, possibly after an established or dynamically calculated time period, i.e., in a time-delayed manner. The method may be continued again with the step of operating the vibration damper in the first state at operation 102. Depending on the second sensor that is utilized, it can also be provided in an example embodiment that the third state is maintained before the reset into the first state until the vibration damper is once again in its initial state before the change of the vertical displacement by the roadway anomaly. The minimum speed of the change may no longer exceeded. The method ends, for example, when the movement of the vehicle ends.

Figure 2:
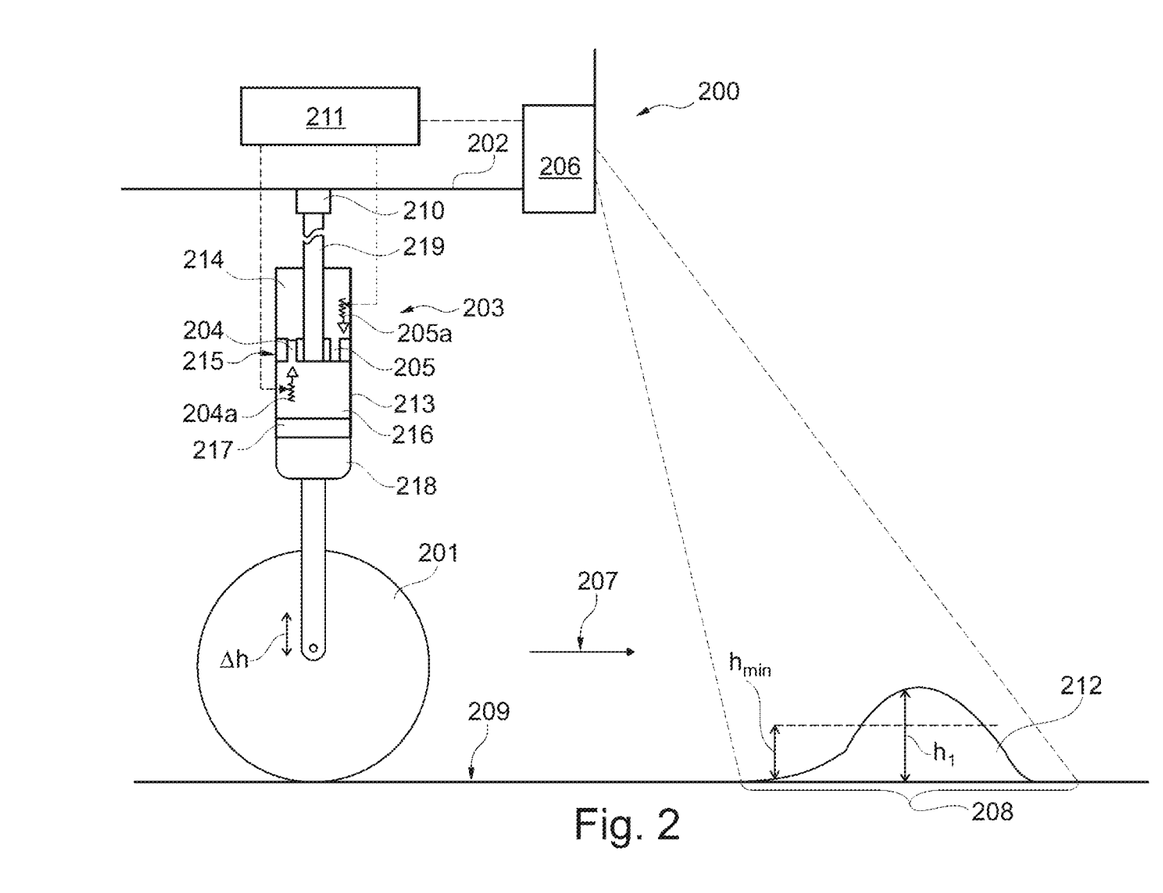
FIG. 2 is a schematic representation of an example of a vehicle with vertical vibration damping of at least one wheel of the vehicle according to an example embodiment.

FIG. 2 shows a schematic representation of an example of a vehicle 200 with vertical vibration damping of at least one wheel 201 of the vehicle 200 according to an example embodiment. The wheel 201 has a suspension at the body of the vehicle, which includes an arrangement of a vibration damper 203 with a final control element including a first actuating element 204 and a second actuating element 205 for adapting a damping characteristic of the vibration damper 203. In addition, the vehicle 200 includes a first sensor 206 for detecting roadway anomalies, for example, the roadway anomaly 212, which has a height $h_1$ greater than a minimum height $h_{min}$, in a region 208 of a roadway surface 209 situated ahead in the movement direction 207 of the vehicle 200. The vehicle 200 also includes a second sensor 210 for detecting a vertical displacement $\Delta h$ of the wheel 201, i.e., a vertical change of length of the vibration damper. The vehicle 200 also includes a control unit 211 connected to the first sensor 206, the second sensor 210, and the first actuating element 204 and the second actuating element 205 of the final control element. The control unit 211 may be configured for carrying out, for example, the method 100 shown in FIG. 1.

The vibration damper 203 shown in FIG. 2 is shown, by way of example, in an embodiment with a cylinder 213 and, thereby, as a single-tube gas pressure vibration damper. This representation was selected by way of example and is not limiting. For example, two- or three-tube dampers, or the like, can also be utilized. The vibration damper 203 may include an oil reservoir 214, which is spatially separated from a working chamber 216 by a first piston 215, but is fluidically connected to this working chamber 216 by a first actuating element 204 designed as a pulling actuating element and a second actuating element 205 designed as a pushing actuating element. The first actuating element 204 may include a first actuator 204a and the second actuating element 205 includes a second actuator 205a, which are designed for adjusting the first and second actuating elements 204, 205. Embodiments with only one actuating element or more than two actuating elements are also possible. The working chamber 216 is separated from a gas cushion 218 by a second piston, the so-called separating piston 217. The first piston 215 is connected via a piston rod 219 to sprung parts of the relevant vehicle 200, in particular to the body 202. The cylinder 213 may be connected to unsprung parts of the relevant vehicle, in particular to the wheel 201.

Figures 3A, 3B:
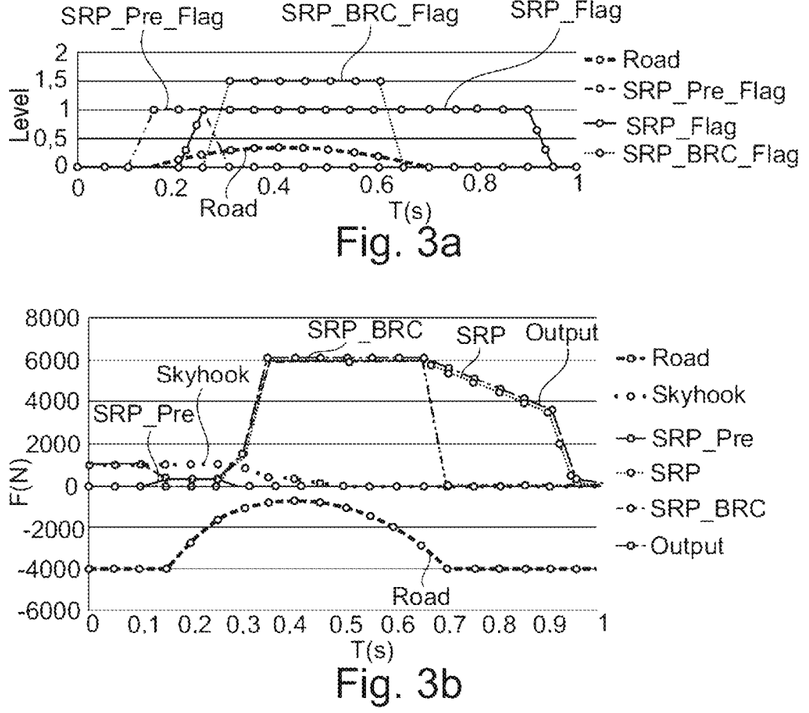
FIG. 3A shows a schematic representation of a profile of state signals over time according to a first example in the case of a correct detection of a roadway anomaly.
FIG. 3B shows a schematic representation of a profile of force requirements on a pushing actuating element of a final control device of a vibration damper over time according to the first example in the case of a correct detection of the roadway anomaly.
Figure 3C:
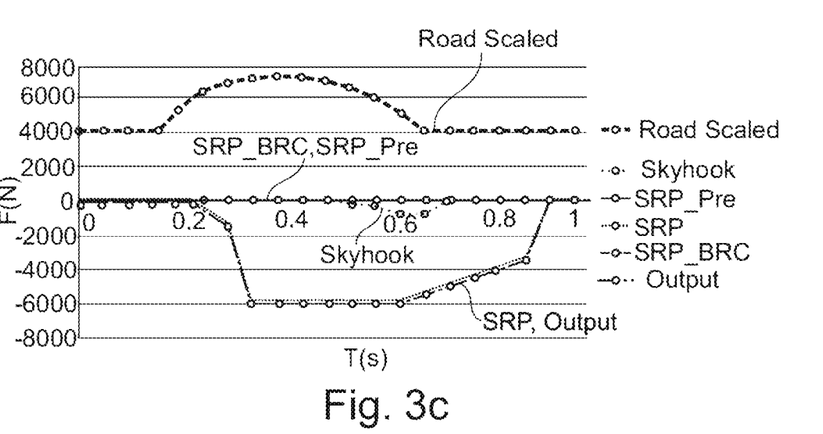
FIG. 3C shows a schematic representation of a profile of force requirements on a pulling actuating element of the final control device of a vibration damper over time according to the first example in the case of a correct detection of the roadway anomaly.

FIG. 3A shows a schematic representation of a profile of state signals over time according to a first example in the case of a correct detection of a roadway anomaly. FIG. 3B shows an associated schematic representation of a profile of force requirements on a pushing actuating element of a final control device of a vibration damper over time according to the first example. FIG. 3C shows an associated schematic representation of a profile of force requirements on a pulling actuating element of the final control device of the vibration damper over time according to the first example. The vibration damper may include a final control element with two valves as a pushing actuating element and a pulling actuating element and may be part of a vehicle with an adaptive suspension system with CCD damping control. The "Road" signal visualizes the basic height profile of the roadway surface (initially flat, then the raised area as the roadway anomaly, then flat again) over time, independently of the unit of the vertical axis in each of FIGS. 3A, 3B and 3C.

FIG. 3A shows the profile of the level of the state signals SRP_Pre_Flag, SRP_Flag, and SRP_BRC_Flag over the time T (in seconds s). The state signal SRP_Pre_Flag initially follows the sensor signal of the first sensor for detecting roadway anomalies situated ahead in the direction of travel, wherein SRP_Pre_Flag switches to the level "1", i.e., "active", when a non-zero change of the roadway height in the area ahead is detected with the first sensor, which exceeds an established minimum height, and wherein a state signal SRP_Flag switches from a level "0" to the level "1", with a simultaneous reset of the level of SRP_Pre_Flag to "0", i.e., "inactive", when a change of the roadway height is detected with the second sensor. The level of SRP_Flag is reset to "0" after the lapse of a time period since the end of a detectable height change. The state signal SRP_BRC_Flag also follows, as a subfunction of SRP_Flag, the sensor signal of the second sensor for detecting the current vertical displacement of the wheel and is set at an elevated level (at "1.4", by way of example, in FIG. 3A) when the vertical displacement of the wheel exceeds the minimum height, and is set to "0" again when the signal of the second sensor indicates no displacement of the wheel of more than the minimum height. If the SRP_BRC_Flag state signal is activated upon contact of the wheel with a roadway anomaly with at least the minimum height, a force requirement signal SRP_BRC is applied at the pushing actuating element. This corresponds to switching the vibration damper into the third state. The level of the force requirement signal SRP_BRC can depend, for example, on the initial vertical speed and/or on the total vertical displacement as the roadway anomaly is traversed and, in one example embodiment, is selected in such a way that the vertical movement of the wheel does not compress the vibration damper to the stop. In some cases, the level of the force requirement signal SRP_BRC may be determined depending on the extent of the vertical displacement of the wheel, the speed, with which the vertical displacement of the wheel (and, thereby, the compression of the vibration damper) takes place, and the remaining distance to a maximum displacement of the wheel.

FIG. 3B shows the associated profile of the force requirements F (in newtons N) on the pushing actuating element over the time T (in seconds s). FIG. 3C shows the associated profile of the force requirements F (in newtons N) on the pulling actuating element over the time T (in seconds s). The "Output" signal shows the actual force requirement applied to the pushing actuating element, while, in FIG. 3B, the signal profiles SRP_Pre, SRP and SRP_BRC indicate the force requirements due to the state signals SRP_Pre_Flag, SRP_Flag and SRP_BRC_Flag, and the "Skyhook" signal indicates the force requirement due to skyhook control. The same applies for the profile of the force requirement on the pulling actuating element shown in FIG. 3C. The profile of "Road Scaled" corresponds to the profile of "Road", merely shifted vertically for the sake of clarity.

In the example shown, a vehicle moves on a roadway with an initially flat surface, wherein the vibration damper in a first state is controlled according to the skyhook principle. At the point in time 0.15 s, a roadway anomaly situated ahead with a height change of more than the minimum height is detected by the first sensor and the SRP_Pre_Flag state signal is set to the state "1". A switch of the vibration damper into the second state takes place, in which, in the example shown, at the pushing actuating element, the previous force requirement according to skyhook control is ignored and a force requirement SRP_Pre reduced as compared thereto is applied, in order to weaken the impending effect. At the pulling actuating element, the appropriate force requirement according to skyhook control is continued unchanged. In the example shown, this is zero at the point in time 0.15 s, as well as SRP_PRE.

At the point in time 0.25 s, the wheel of the vehicle reaches the beginning of the roadway anomaly and undergoes a vertical displacement, and so the level of the SRP_Flag state signal is set to "1", with a simultaneous reset of the level of SRP_Pre_Flag to "0". In the example shown, the reduced force requirement on the pushing actuating element applied in the second state is initially maintained, in order to weaken the effect of the roadway anomaly. At the pulling actuating element, the appropriate force requirement according to skyhook control is continued unchanged. In the example shown, this is still without effect at the point in time 0.25 s.

At the point in time 0.3 s, a vertical displacement Δh of the wheel by more than the minimum height $h_{min}$ is detected by the second sensor and the state signal SRP_BRC_Flag is set to "1". A switch of the vibration damper into the third state takes place, in which the force requirement is increased, in order to control the movement of the wheel. The force requirement is applied to the pushing actuating element according to the SRP signal, just like the pulling actuating element (but with a negative sign).

At the point in time 0.7 s, the roadway anomaly is over and the signal for the force requirement SRP_BRC is reset back to zero. The force requirements on the actuating elements may still be maintained by the SRP signal and may be reset in a controlled manner according to a selected ramp function, in order to control the movements of the vehicle body. This terminates the current process of the vibration damping of the wheel triggered by the detection of the roadway anomaly.

Figure 4A:
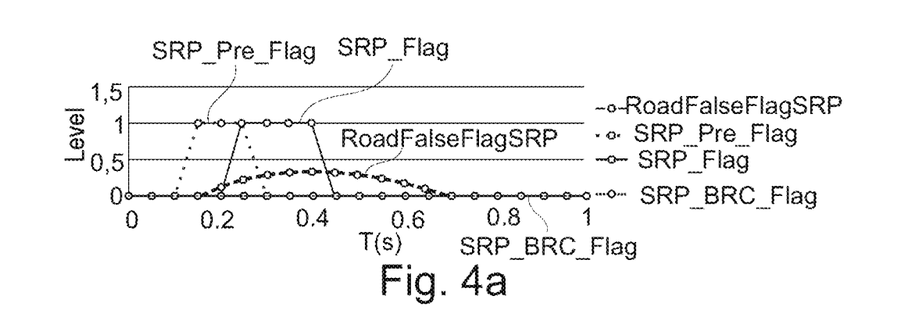
FIG. 4A shows a schematic representation of a profile of state signals over time according to a second example in the case of an erroneous detection of a roadway anomaly.
Figure 4B:
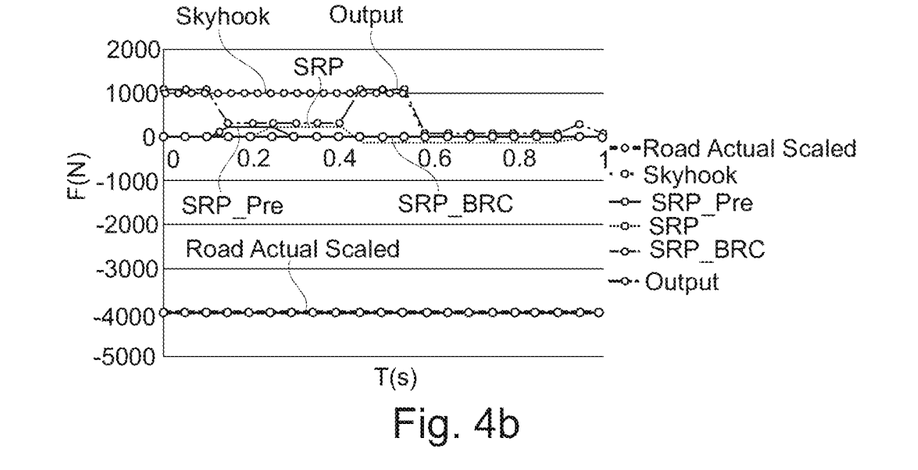
FIG. 4B shows a schematic representation of a profile of force requirements on a pushing actuating element of a final control device of a vibration damper over time according to the second example in the case of an erroneous detection of the roadway anomaly.
Figure 4C:
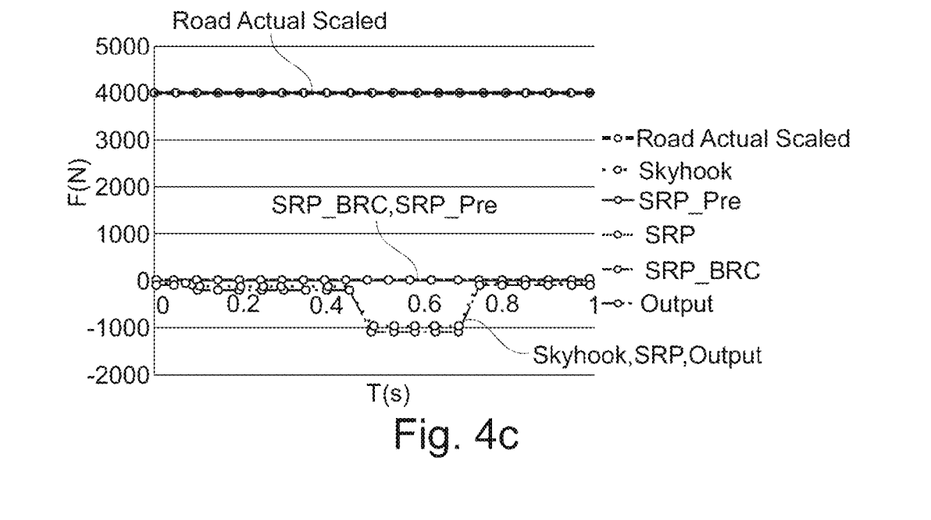
FIG. 4C shows a schematic representation of a profile of force requirements on a pulling actuating element of the final control device of a vibration damper over time according to the second example in the case of an erroneous detection of the roadway anomaly.

With reference to FIGS. 4A, 4B and 4C, the appropriate operation of the vibration damper will now be described when the detection of the roadway anomaly by the first sensor is an erroneous detection. FIG. 4A shows a schematic representation of a profile of state signals over time according to a second example in the case of an erroneous detection of a roadway anomaly, FIG. 4B shows an associated schematic representation of a profile of force requirements on the pushing actuating element of the final control device of the vibration damper over time according to the second example, and FIG. 4C shows an associated schematic representation of a profile of force requirements on the pulling actuating element of the final control device of the vibration damper over time according to the second example. It is important to note that the "RoadFalseFLagSRP" signal visualizes the basic height profile of the roadway surface over time, independently of the unit of the vertical axis in FIG. 4A, as it is erroneously detected by the first sensor signal. The "Road Actual Scaled" signal visualizes the actual flat height profile of the roadway surface over time independently of the unit of the vertical axis in each of FIGS. 4B and 4C.

In the second example, a vehicle moves on a roadway with a flat surface, which now does not have roadway anomaly. Nevertheless, in this example, a roadway anomaly is detected in the first sensor signal. The vibration damper is initially controlled in a first state according to the skyhook principle. At the point in time 0.15 s, a roadway anomaly perceived to be situated ahead, with a non-zero height change greater than the minimum height, is detected by the first sensor and the SRP_Pre_Flag state signal is set to the state "1". A switch of the vibration damper into the second state takes place, in which, in the example shown, at the pushing actuating element, the previous force requirement according to skyhook control is ignored and a force requirement SRP_Pre reduced as compared thereto is applied, in order to weaken the perceived impending effect. At the pulling actuating element, the appropriate force requirement according to skyhook control is continued unchanged. In the example shown, this is zero at the point in time 0.15 s, as well as SRP_PRE.

At the point in time 0.25 s, the level of the SRP_Flag state signal is set to "1", with a simultaneous reset of the level of SRP_Pre_Flag to "0". In the example shown, the reduced force requirement at the pushing actuating element applied in the intermediate state is initially maintained, in order to weaken the perceived effect of the roadway anomaly. At the pulling actuating element, the appropriate force requirement according to skyhook control is continued unchanged. In the example shown, this is still without effect at the point in time 0.25 s.

In contrast to the first example shown in FIGS. 3A, 3B and 3C, a vertical displacement of the wheel by more than the minimum height does not take place within the, for example, speed-dependent detection period, however, and the state signal SRP_BRC_Flag remains inactive, i.e., here at the level "0". At the point in time 0.4 s, the detection period is over and, since the SRP_BRC_Flag state signal has remained inactive and, thereby, a confirmation of the detection of the roadway anomaly of the first sensor by the second sensor has not taken place, the SRP_Flag state signal is reset to "0". A switch into the third state does not take place, but rather a switch back into the original first state takes place, in which the actuating elements are controlled according to the skyhook control signal.

In this way, the effect of the erroneous detection is concluded early and only a very minor reduction of the ride comfort briefly arises due to a force requirement by the skyhook control that is too low before the SRP_Flag state signal is deactivated again, i.e., reset to the level "0".

Even though the above-described examples relate to the operation of a vibration damper with two actuating elements, the method may also be suited for the operation of a vibration damper with only one actuating element. A minimum selection is utilized in the first state, possibly including the preparation state, and in the second state, i.e., before the actual event, here the traversing of the roadway anomaly, when the minimum height is exceeded, and a maximum selection is utilized in the third state while and after the roadway anomaly is traversed.

It is understood that method steps, although described according to a certain ordered sequence, could be carried out, in part, in a sequence other than that described here. Moreover, it is understood that certain steps can be carried out simultaneously or one after the other, once or multiple times, that other steps could be added, or that certain steps described here could be omitted. In other words: The present descriptions are provided for the purpose of illustrating certain embodiments and should not be construed as a limitation of the disclosed subject matter.

The expression "and/or" utilized here, when used in a sequence of two or more elements, means that each of the listed elements can be used alone, or any combination of two or more of the listed elements can be used. If, for example, a composition is described, which contains the components A, B, and/or C, the composition can contain A alone; B alone; C alone; A and B in combination; A and C in combination; B and C in combination; or A, B, and C in combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for controlling a vertical vibration damping of a wheel of a vehicle, in which the wheel has a suspension, which includes a vibration damper with a control element including an actuating element for adapting a damping characteristic of the vibration damper, and the vehicle includes a first sensor for detecting roadway anomalies in a region of a roadway surface situated ahead in the movement direction of the vehicle, a second sensor for detecting a vertical displacement of the wheel, and a control unit connected to the first sensor, the second sensor, and the control element, the method comprising:

detecting roadway anomalies with the first sensor during movement of the vehicle;

detecting the vertical displacement with the second sensor; and switching the vibration damper with the control element at a first point in time from a first state with a first damping characteristic into a second state with a second damping characteristic responsive to a first sensor signal generated by the first sensor indicates a roadway anomaly with a minimum height, wherein a reset of the vibration damper with the control element from the second state into the first state takes place responsive to a second sensor signal generated by the second sensor does not indicate a change of the vertical displacement by at least the minimum height within a detection period starting with the first point in time and/or a speed of the change of the vertical displacement exceeds a minimum speed, wherein switching the vibration damper into the second state includes:

applying a force requirement to the control element that depends on a classification of the roadway anomaly with respect to a vertical dimension, a gradient of edges of the roadway anomaly, and the speed of the vehicle, or operating the control element with a skyhook control reduced as compared to a skyhook control in the first state with a reduced force requirement, and wherein switching the vibration damper into the second state includes determining a plurality of possible force requirements and, from the possible force requirements determined, selecting a minimum force requirement to be applied to the control element.

2. The method of claim 1, further comprising:

detecting a current speed of the vehicle; and establishing the detection period depending on the current speed of the vehicle and a distance of the roadway anomaly to the vehicle.

3. The method of claim 2, further comprising switching the vibration damper with the control element from the second state into a third state with a third damping characteristic responsive to the second sensor signal generated by the second sensor indicates a change of the vertical displacement by at least the minimum height within the detection period.

4. The method of claim 3, wherein switching the vibration damper into the third state includes applying a force requirement to the control element, the force requirement depending on the extent of the vertical displacement of the wheel, and a remaining distance to a maximum displacement of the wheel.

5. The method of claim 4, wherein switching the vibration damper into the third state includes:

applying a constant force requirement to the control element that is increased as compared to a force requirement of the first state, or operating the control element with a skyhook control that is intensified as compared to a skyhook control of the first state with an increased force requirement, or in the third state, applying a second force requirement according to a decay function to the control element.

6. The method of claim 5, wherein switching the vibration damper into the third state includes determining a plurality of possible force requirements and, from the possible force requirements determined, selecting a maximum force requirement to be applied to the control element.

7. A vehicle suspension system with vertical vibration damping of at least one wheel of the vehicle, the system comprising:

a vibration damper; and a control element operably coupled to the vibration damper, the control element including at least one actuating element for adapting a damping characteristic of the vibration damper;

wherein the vehicle comprises:

a first sensor for detecting roadway anomalies in a region of a roadway surface situated ahead in a movement direction of the vehicle, a second sensor for detecting a vertical displacement ($\Delta h$) of the wheel, and a control unit operably coupled to the first sensor, the second sensor, and the control element, wherein the control unit is configured for:

detecting roadway anomalies with the first sensor during movement of the vehicle;

detecting the vertical displacement with the second sensor; and switching the vibration damper with the control element at a first point in time from a first state with a first damping characteristic into a second state with a second damping characteristic when a first sensor signal generated by the first sensor indicates a roadway anomaly with a minimum height, wherein a reset of the vibration damper with the control element from the second state into the first state takes place when a second sensor signal generated by the second sensor does not indicate a change of the vertical displacement by at least the minimum height within a detection period starting with the first point in time and/or a speed of the change of the vertical displacement exceeds a minimum speed, wherein the control unit is configured for switching the vibration damper into the second state by:

applying a force requirement to the control element that depends on a classification of the roadway anomaly with respect to a vertical dimension, a gradient of edges of the roadway anomaly, and the speed of the vehicle, or operating the control element with a skyhook control reduced as compared to a skyhook control in the first state with a reduced force requirement, and wherein the control unit is configured for switching the vibration damper into the second state by determining a plurality of possible force requirements and, from the possible force requirements determined, selecting a minimum force requirement to be applied to the control element.

8. The vehicle suspension system of claim 7, wherein the control unit is further configured for:

detecting a current speed of the vehicle; and establishing the detection period depending on the current speed of the vehicle and a distance of the roadway anomaly to the vehicle.

9. The vehicle suspension system of claim 8, wherein the control unit is further configured for switching the vibration damper with the control element from the second state into a third state with a third damping characteristic when the second sensor signal generated by the second sensor indicates a change of the vertical displacement by at least the minimum height within the detection period.

10. The vehicle suspension system of claim 9, wherein the control unit is configured for switching the vibration damper into the third state by applying a force requirement to the control element, the force requirement depending on the extent of the vertical displacement of the wheel, and a remaining distance to a maximum displacement of the wheel.

11. The vehicle suspension system of claim 10, wherein the control unit is configured for switching the vibration damper into the third state by:

applying a constant force requirement to the control element that is increased as compared to a force requirement of the first state, or operating the control element with a skyhook control that is intensified as compared to a skyhook control of the first state with an increased force requirement, or in the third state, applying a second force requirement according to a decay function to the control element.

12. The vehicle suspension system of claim 11, wherein the control unit is configured for switching the vibration damper into the third state by determining a plurality of possible force requirements and, from the possible force requirements determined, selecting a maximum force requirement to be applied to the control element.

* * * * *